(12) United States Patent
Melaku et al.

(10) Patent No.: US 7,308,356 B2
(45) Date of Patent: Dec. 11, 2007

(54) WIRELESS PERSONALIZED SELF-SERVICE NETWORK

(75) Inventors: Makonnen Melaku, North Andover, MA (US); Zhongsu Fu, Wakefield, MA (US); Seshadri Mohan, Basking Ridge, NJ (US)

(73) Assignee: Comverse, Inc., Wakefield, MA (US)

( * ) Notice: Subject to any disclaimer, the term of this patent is extended or adjusted under 35 U.S.C. 154(b) by 811 days.

(21) Appl. No.: 10/059,007

(22) Filed: Jan. 30, 2002

(65) Prior Publication Data

US 2003/0144793 A1 Jul. 31, 2003

(51) Int. Cl.
*G01C 21/00* (2006.01)
(52) U.S. Cl. .................. 701/200; 701/201; 455/456.1; 379/88.01
(58) Field of Classification Search .............. 701/209, 701/25, 208, 200–201; 705/26, 27; 455/456.1; 379/88.01
See application file for complete search history.

(56) References Cited

U.S. PATENT DOCUMENTS

| | | | | |
|---|---|---|---|---|
| 4,882,724 | A | 11/1989 | Vela et al. ................... | 364/401 |
| 5,250,789 | A | 10/1993 | Johnsen ....................... | 235/383 |
| 5,424,524 | A | 6/1995 | Ruppert et al. ............. | 235/462 |
| 5,559,707 | A * | 9/1996 | DeLorme et al. ........... | 701/200 |
| 5,630,068 | A | 5/1997 | Vela et al. ................... | 395/201 |
| 5,640,002 | A | 6/1997 | Ruppert et al. ............. | 235/472 |
| 5,887,271 | A | 3/1999 | Powell ......................... | 705/14 |
| 6,091,956 | A * | 7/2000 | Hollenberg .............. | 455/456.5 |
| 6,119,014 | A | 9/2000 | Alperovich et al. ......... | 455/466 |
| 6,123,259 | A | 9/2000 | Ogasawara .................. | 235/380 |
| 6,129,276 | A | 10/2000 | Jelen et al. .................. | 235/375 |
| 6,177,905 | B1 | 1/2001 | Welch ................... | 342/357.13 |
| 6,199,753 | B1 | 3/2001 | Tracy et al. ................. | 235/375 |
| 6,321,158 | B1 * | 11/2001 | DeLorme et al. ........... | 701/201 |
| 6,321,161 | B1 * | 11/2001 | Herbst et al. ............... | 701/210 |
| 6,347,278 | B2 * | 2/2002 | Ito .............................. | 701/200 |
| 6,386,450 | B1 * | 5/2002 | Ogasawara ................. | 235/383 |

(Continued)

FOREIGN PATENT DOCUMENTS

WO          WO 01/20522 A1          3/2001          .................... 17/60

(Continued)

OTHER PUBLICATIONS

An Architecture and Business Model for Making Software Agents Commercially Viable, Mahmoud, Q.H.; Yu, L.; System Sciences, 2005. HICSS '05. Proceedings of the 38th Annual Hawaii International Conference on, Jan. 3-6, 2005 pp. 71c-71c, Digital Object Identifier 10.1109/HICSS.2005.79.*

(Continued)

*Primary Examiner*—Cuong Nguyen
(74) *Attorney, Agent, or Firm*—Staas & Halsey LLP

(57) ABSTRACT

The present invention is a system that allows customers to use a mobile device or personal terminal to obtain complete product or service information so as to complete an impartial list. The system aides in the identification of a store or place of interest where the customer may obtain the list items. The system further provides the customer with directions to the store or place of interest, and to the needed item or service within the store, thereby increasing the customers efficiency. The list and directions may be dynamically changed based upon the customers changing needs and changing location.

2 Claims, 18 Drawing Sheets

List Matching Service Flow Chart

U.S. PATENT DOCUMENTS

| | | | |
|---|---|---|---|
| 6,459,966 B2 * | 10/2002 | Nakano et al. ............... | 701/23 |
| 6,484,091 B2 * | 11/2002 | Shibata et al. .............. | 701/208 |
| 6,490,522 B2 * | 12/2002 | Sugiyama et al. .......... | 701/211 |
| 6,526,348 B1 * | 2/2003 | McDonough ............... | 701/209 |
| 6,650,735 B2 * | 11/2003 | Burton et al. ............ | 379/88.01 |
| 6,839,629 B2 * | 1/2005 | Cato et al. .................. | 701/209 |
| 7,031,945 B1 * | 4/2006 | Donner ........................ | 705/64 |
| 7,050,905 B2 * | 5/2006 | Nemeth ....................... | 701/201 |
| 7,076,255 B2 * | 7/2006 | Parupudi et al. ......... | 455/456.1 |

FOREIGN PATENT DOCUMENTS

| | | | | |
|---|---|---|---|---|
| WO | WO 01/20526 A1 | 3/2001 | .................... | 17/60 |
| WO | WO 01/20527 A1 | 3/2001 | .................... | 17/60 |

OTHER PUBLICATIONS

SMS: Simplifying Mobile Services—for Users and Service Providers,Bartolomeo, G.; BlefariMelazzi, N.; Cortese, G.; Friday, A.; Prezerakos, G.; walker, R.; Salsano, S.;Telecommunications, 2006, AICT-ICIW '06. International Conference on Internet and Web Applications and Services/Advanced International Conference on, Feb. 19-25, 2006 pp. 209-220.*

A Privacy Service to Context-aware Mobile Computing, Sacramento, V.; Endler, M.; Nascimento, F.N.; Security and Privacy for Emerging Areas in Communications Networks, 2005. SecureComm 2005. First International Conference on, Sep. 5-9, 2005 pp. 182-193, Digital Object Identifier 10.1109/SECURECOMM.2005.8.*

SMERT: energy-efficienct design of a multimedia messaging system for mobile devices, Lin Zhong; Bin Wei, Sinclair, M.J.; Design Automation Conference, 2006 43rd ACM/IEEE, Jul. 24-28, 2006 pp. 586-591.*

Efficient Querying and Resource Management Using Distributed Presence Information in Converged Networks, Chakraborty, D.; Dasgupta, K.; Misra, A.; Mobile Data Management, 2006. MDM 2006. 7th International Conference on, May 10-12, 2006, pp. 28-28, Digital Object Identifier 10.1109/MDM.2006.81.*

Configuring push-based Web services, Brenna, L.; Johansen, D.; Next Generation Web Services Practices, 2005. NWeSP 2005. International Conference on, Aug. 22-26, 2005 Page(s):6 pp. , Digital Object identifier 10.1109/NWESP.2005.25.*

* cited by examiner

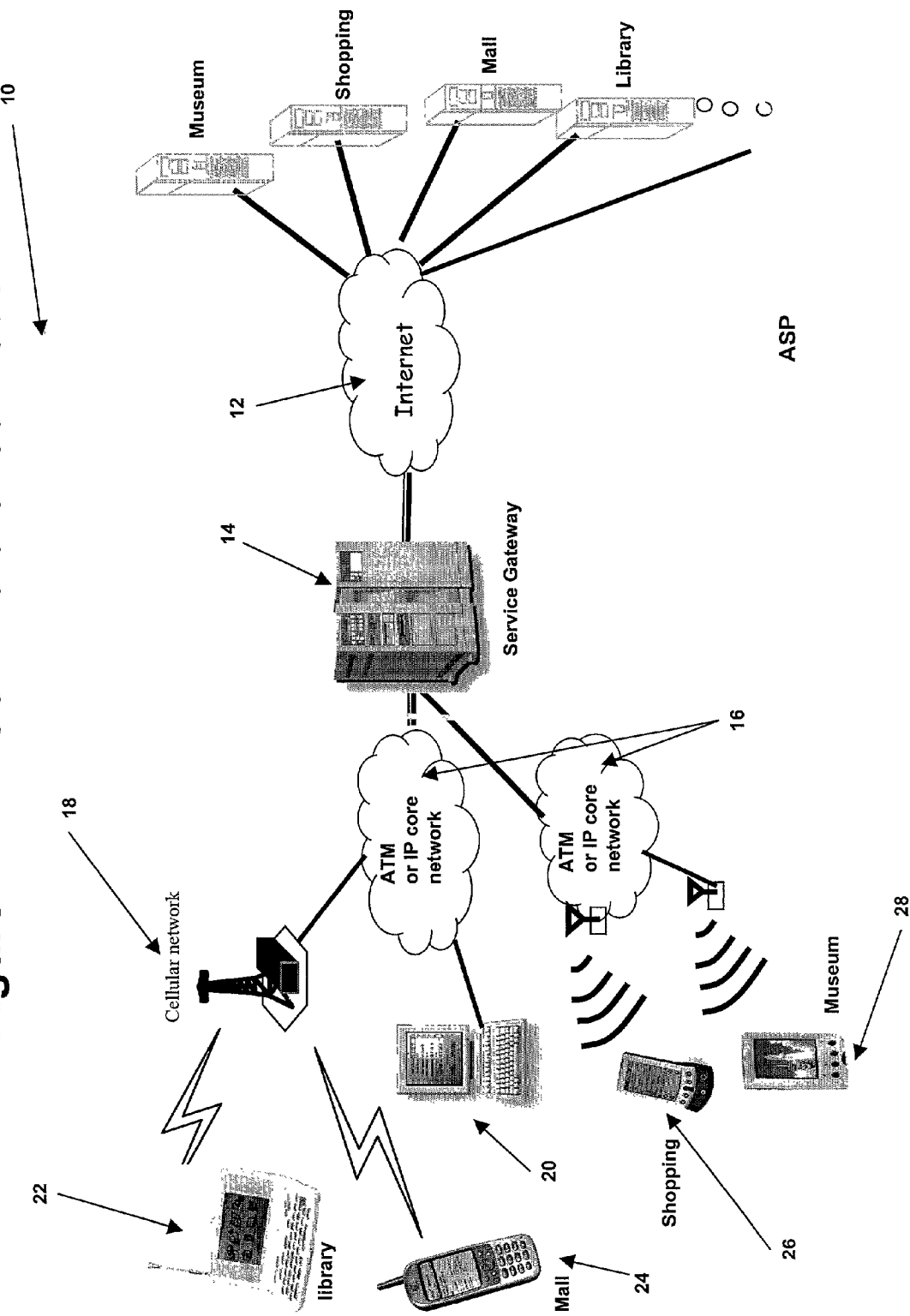
Figure 1: WPSSN Reference Model

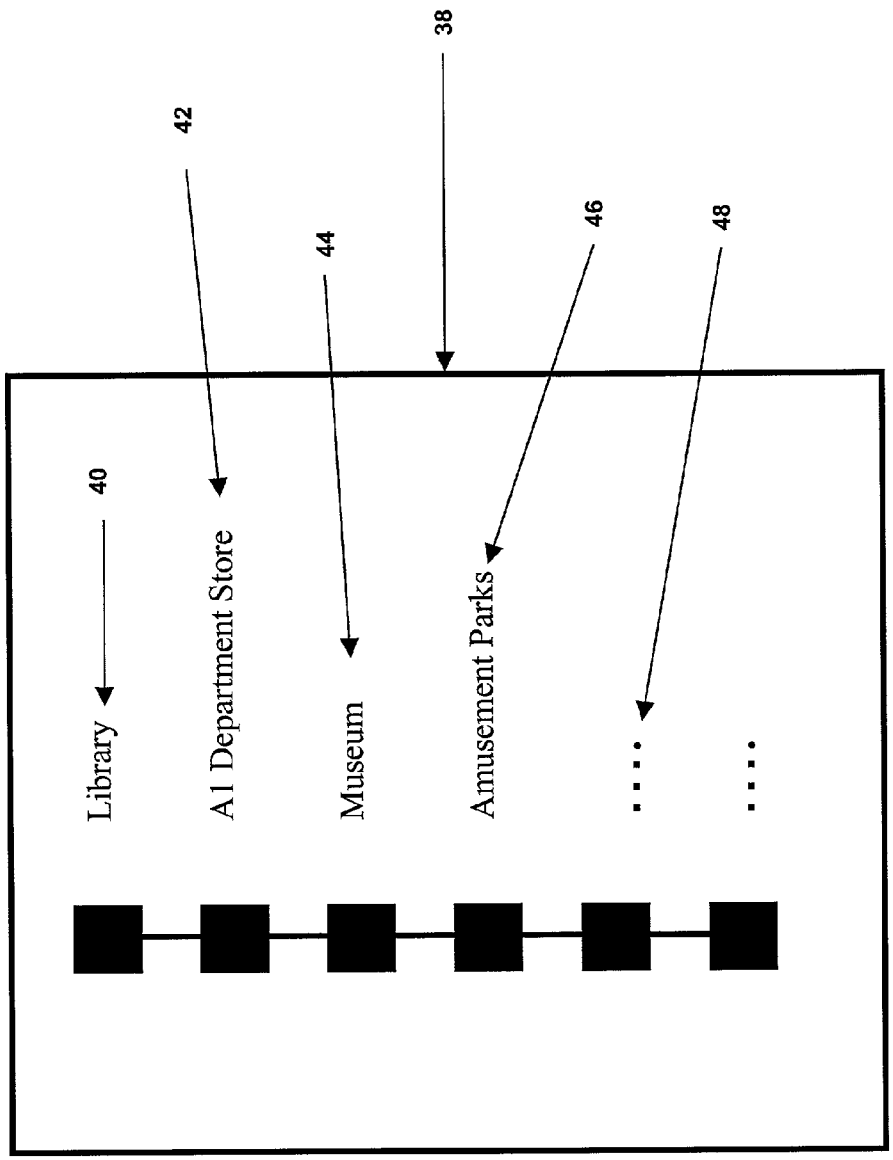
Figure 2: Example Service List From Which a User May Choose a Service

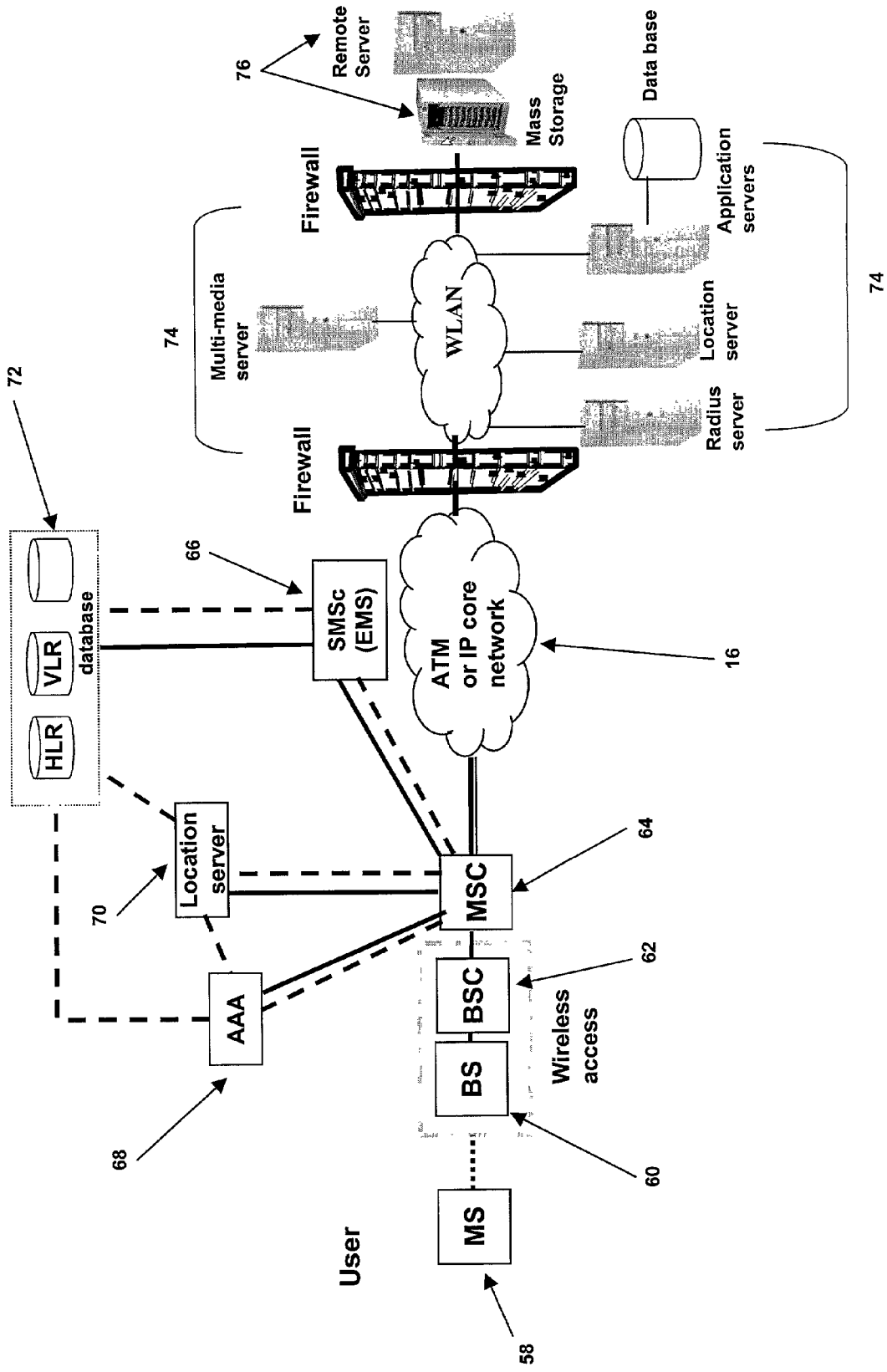
Figure 3: High Level End to End System Architecture

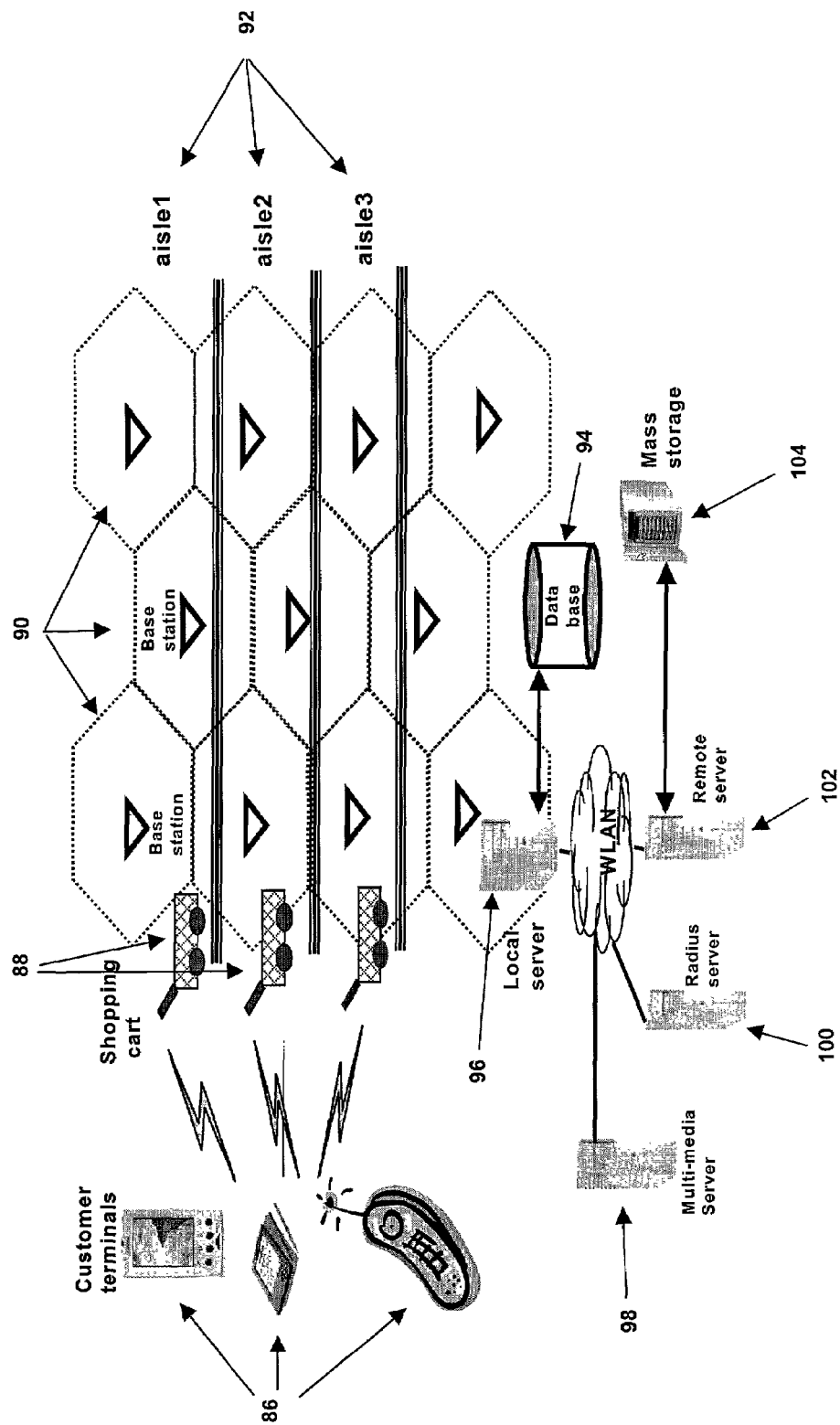
Figure 4: WPSSN Wireless Networked Store System Architecture

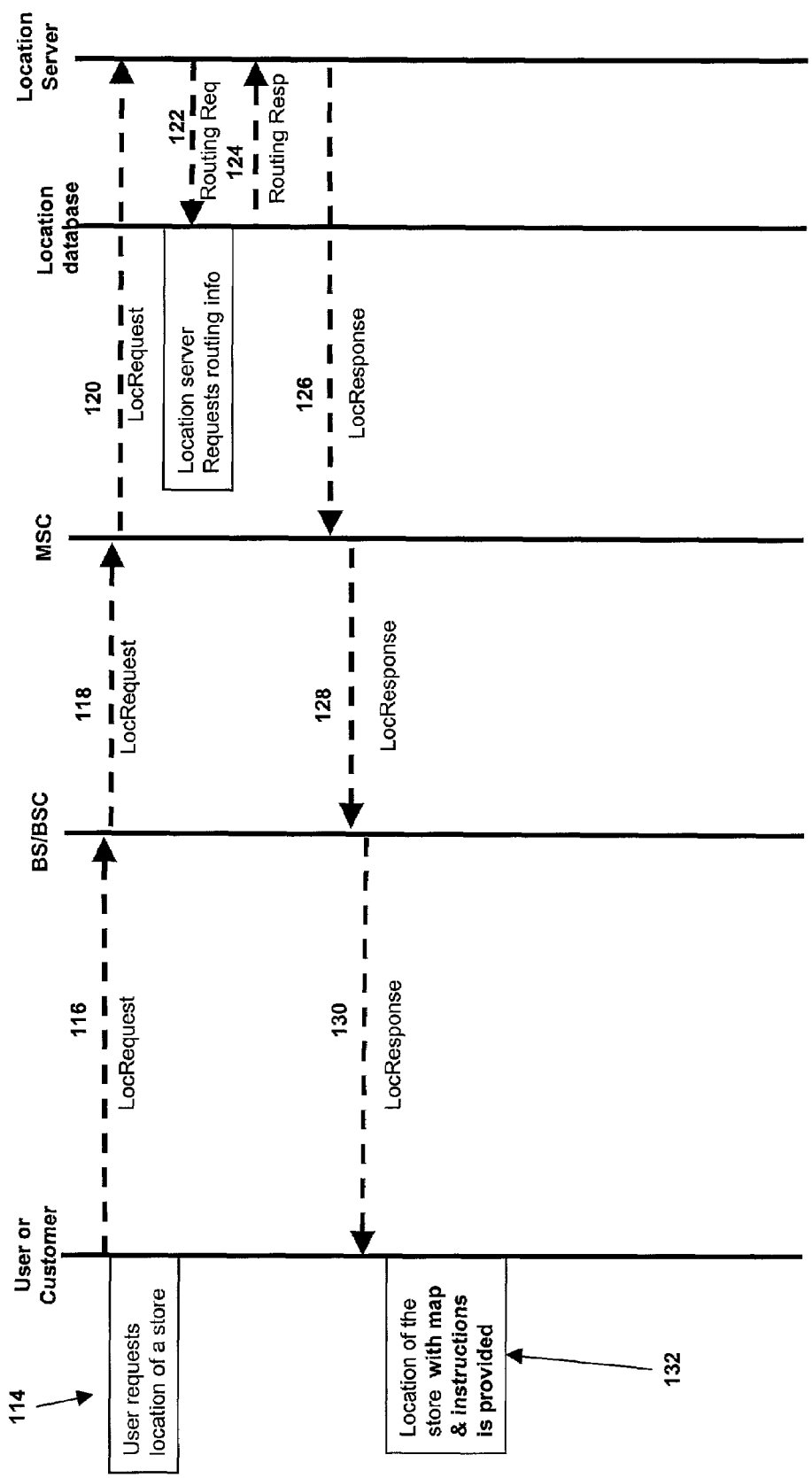
Figure 5: Signal Flow of Customer Request for Store Location and Directions

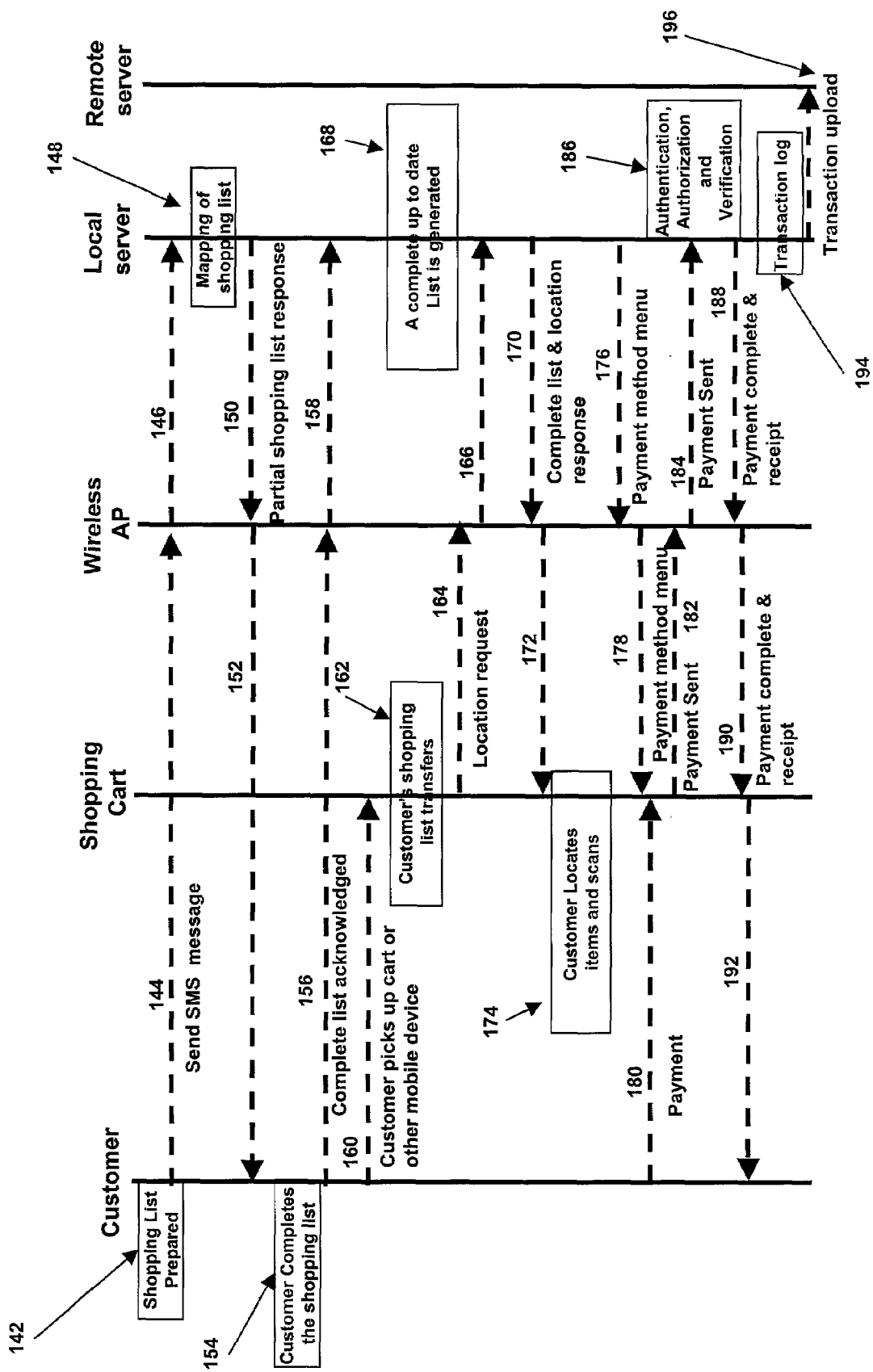
Figure 6: End-to-End Data Flow

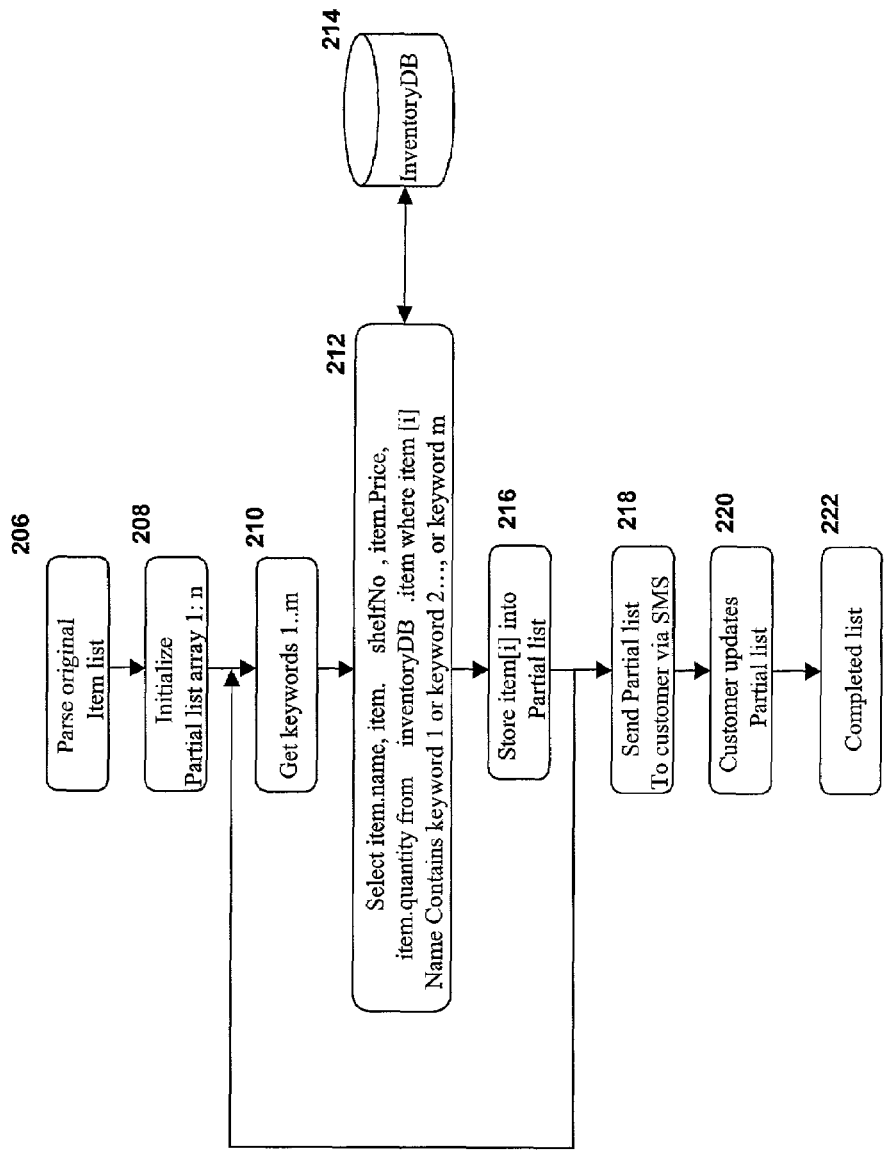
Figure 7: List Matching Service Flow Chart

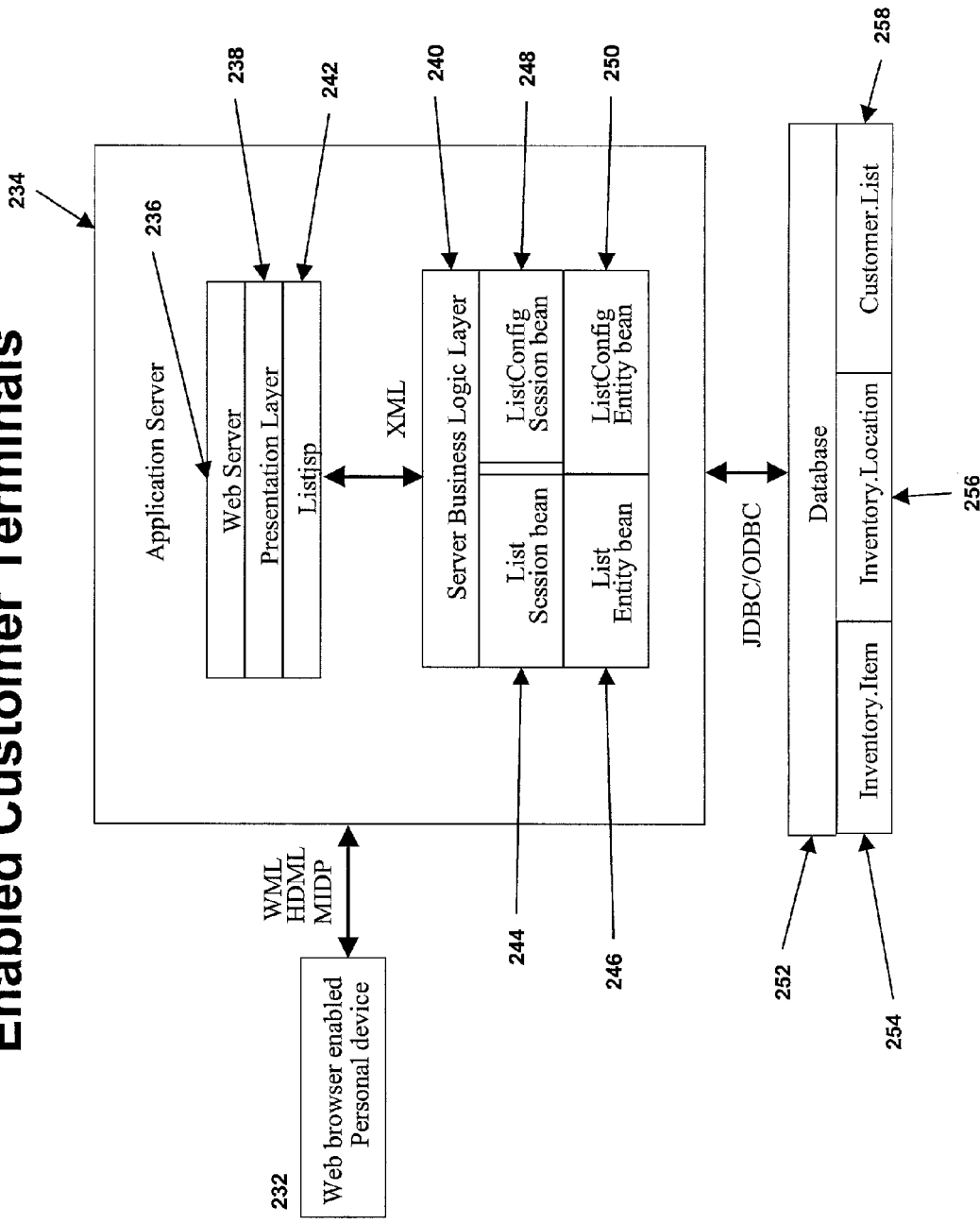
Figure 8: A Client Server Implementation for Web Enabled Customer Terminals

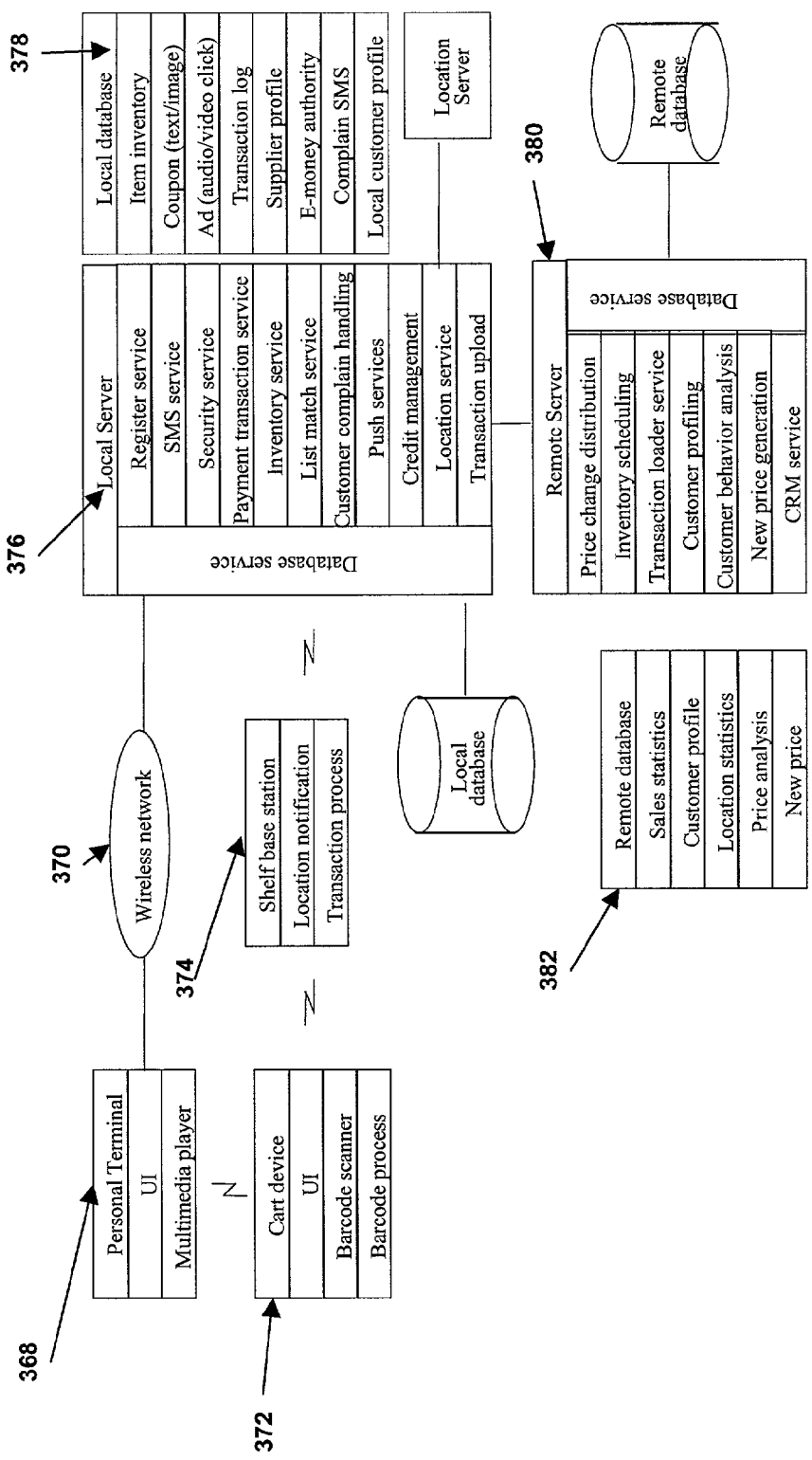
Figure 9: Component Breakdown of the WPSSN System

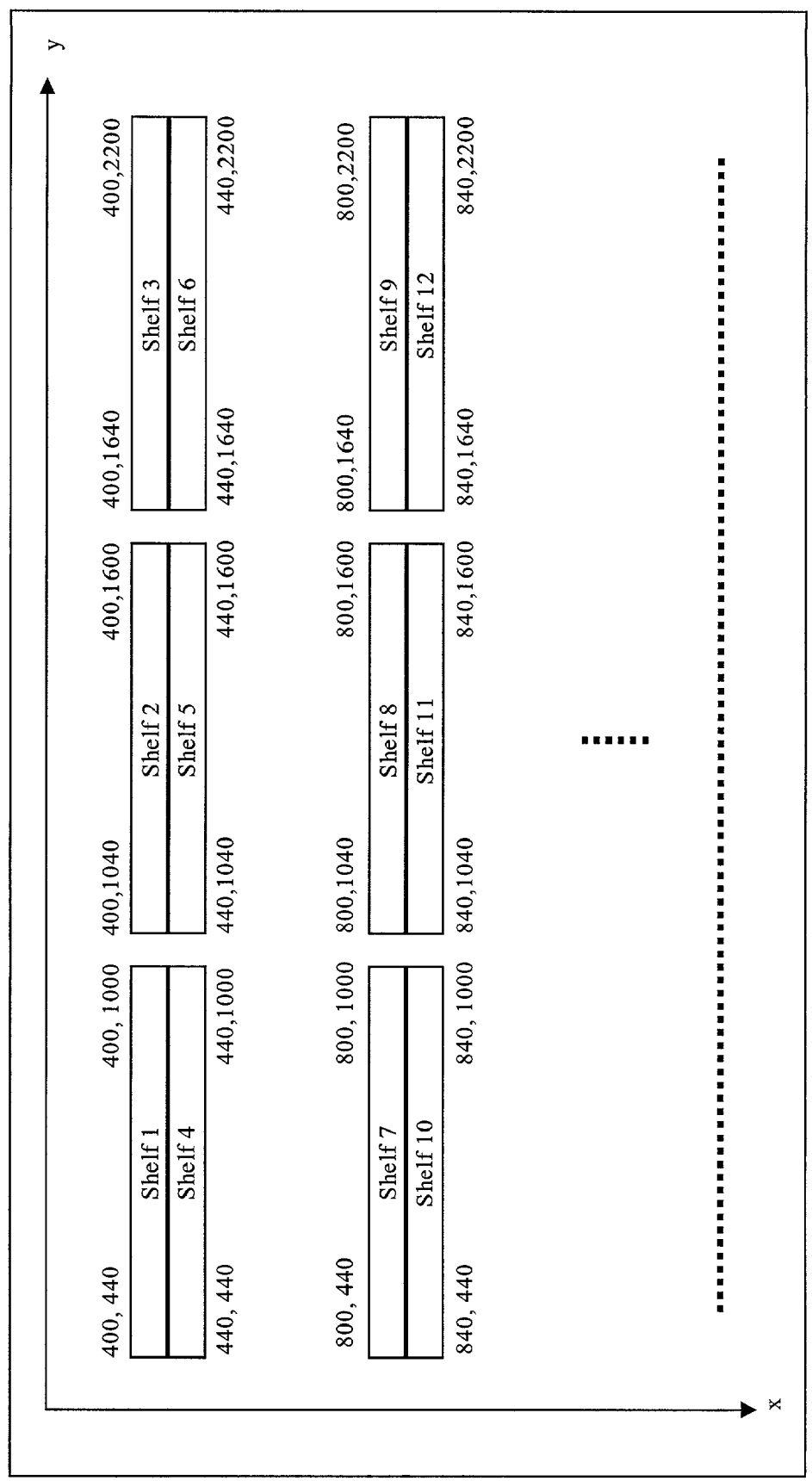
Figure 10: Shop Shelf Layout

Figure 11: Shop Shelf Layout Table

| Location Shelf number | Location (cm, cm) x1, y1 | x2, y2 |
|---|---|---|
| 1 | 400, 440 | 400, 1000 |
| 2 | 400, 1040 | 400, 1600 |
| 3 | 400, 1640 | 400, 2200 |
| 4 | 440, 440 | 440, 1000 |
| 5 | 440, 1040 | 440, 1600 |
| 6 | 440, 1640 | 440, 2200 |
| 7 | 800, 400 | 800, 1000 |
| 8 | 800, 1040 | 800, 1600 |
| 9 | 800, 1640 | 800, 2200 |
| 10 | 840, 440 | 840, 1000 |
| 11 | 840, 1040 | 840, 1600 |
| 12 | 840, 1640 | 840, 2200 |
| ... | ... | ... |

Figure 11a: Shop Item Table

| Category  | Description   |
|-----------|---------------|
| 0000 0001 | Milk products |
| 0000 0002 | Vegetable     |
| 0000 0003 | Meat products |
| ...       |               |

| Item No/Barcode | Category code | Item Name | Location (Shelf #) |
|-----------------|---------------|-----------|--------------------|
| 1000 0000 0001  | 0000 0001     | Yogurt    | 1                  |
| 2000 0000 0001  | 0000 0002     | Tomato    | 5                  |
| 2000 0000 0002  | 0000 0002     | Celery    | 5                  |
| 3000 0000 0001  | 0000 0003     | Lean beef | 6                  |
| ...             |               | ...       | ...                |

Figure 11b: Item List Table

| Item No/Barcode | Category code | Item Name | Location | Consumed (Y/N) |
|---|---|---|---|---|
| 1000 0000 0001 | 0000 0001 | Yogurt | 1 | N |
| 2000 0000 0001 | 0000 0002 | Tomato | 5 | N |
| 2000 0000 0002 | 0000 0002 | Celery | 5 | N |
| 3000 0000 0001 | 0000 0003 | Lean beef | 6 | N |

Figure 11c: Partially Consumed Item List Table

| Item No/Barcode | Category code | Item Name | Location | Consumed (Y/N) |
|---|---|---|---|---|
| 1000 0000 0001 | 0000 0001 | Yogurt | 1 | N |
| 2000 0000 0001 | 0000 0002 | Tomato | 5 | N |
| 2000 0000 0002 | 0000 0002 | Celery | 5 | N |
| 3000 0000 0001 | 0000 0003 | Lean beef | 6 | Y |

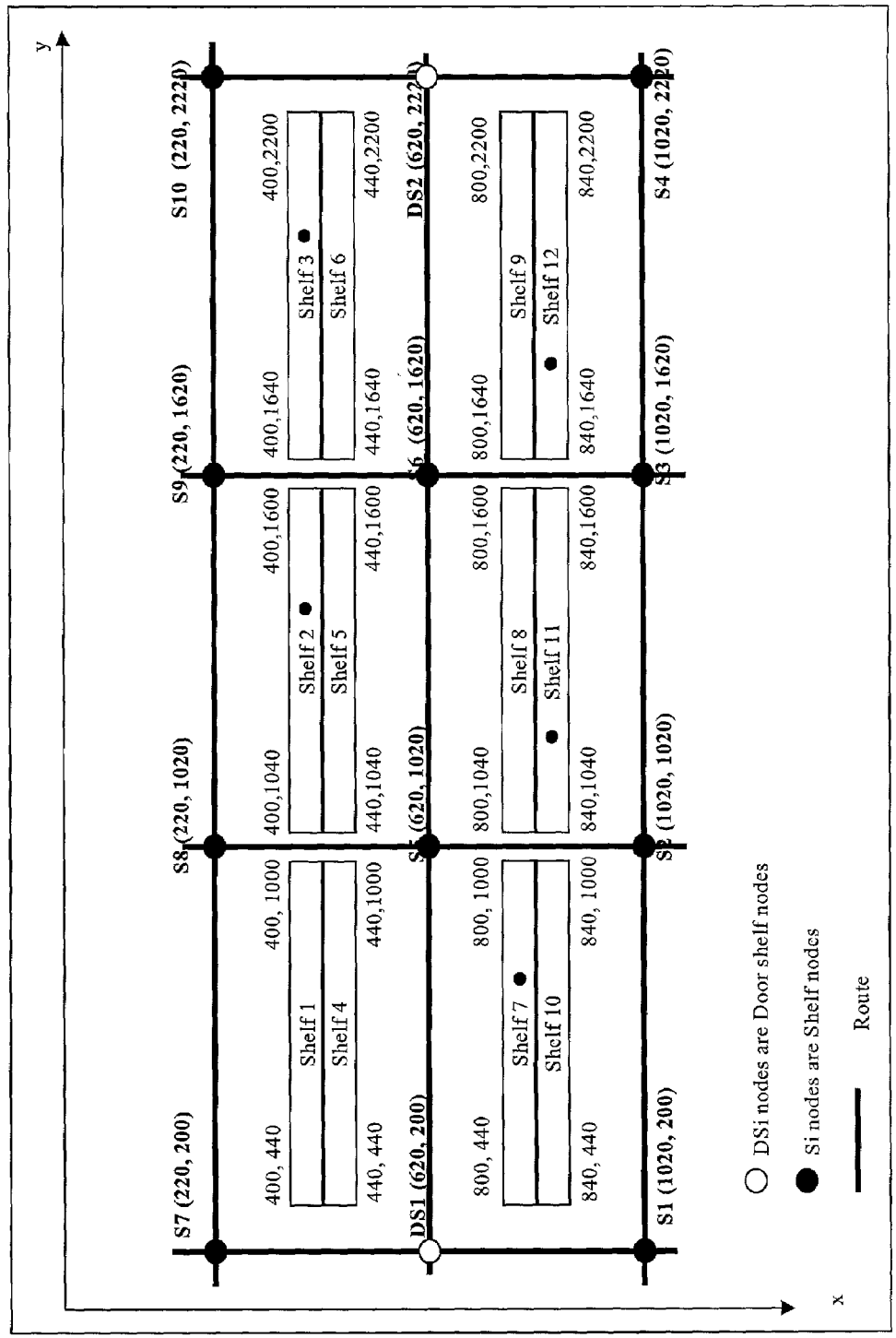
Figure 12: WPSSN Routing Example

Figure 13: Routing Table

| Node name | Adj. shelf Nos | Adj. node | Location (x, y) |
|---|---|---|---|
| DS1 | 4, 7 | S7, S5, S1 | (620, 200) |
| DS2 | 6, 9 | S10, S6, S4 | (620, 2220) |
| S1 | 10 | DS1, S2 | (1020, 200) |
| S2 | 10, 11 | S1, S5, S3 | (1020, 1020) |
| S3 | 11, 12 | S2, S6, S4 | (1020, 1620) |
| S4 | 12 | S3, Ds2 | (1020, 2220) |
| S5 | 4, 7, 5, 8 | DS1, S2, S6, S8 | (620, 1020) |
| S6 | 5, 8, 6, 9 | S5, S3, DS2, S9 | (620, 1620) |
| S7 | 1 | DS1, S8 | (220, 200) |
| S8 | 1, 2 | S7, S5, S9 | (220, 1020) |
| S9 | 2, 3 | S8, S6, S10 | (220, 1620) |
| S10 | 3 | S9, DS2 | (220, 2220) |

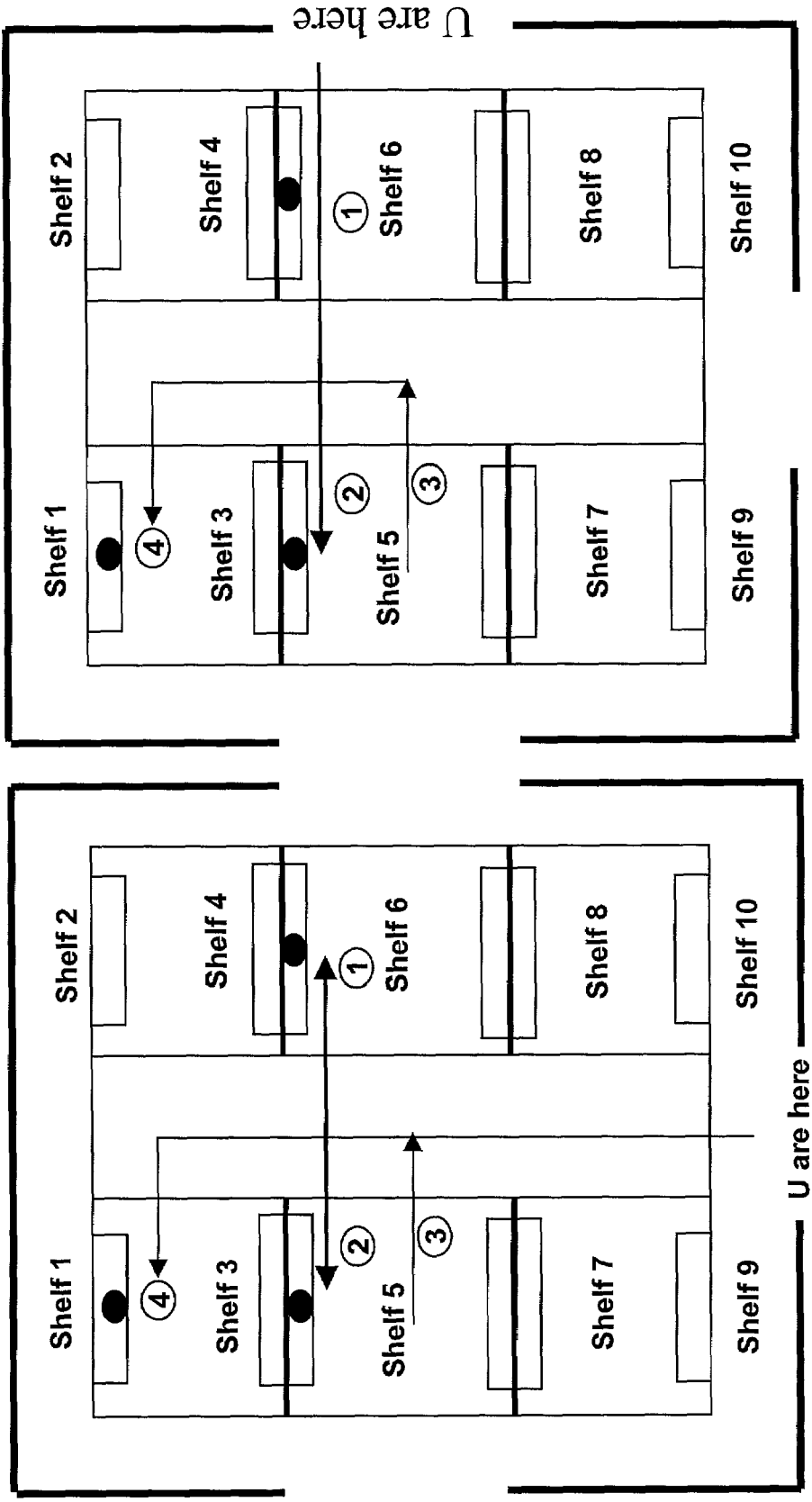
Figure 14: Example Route Display

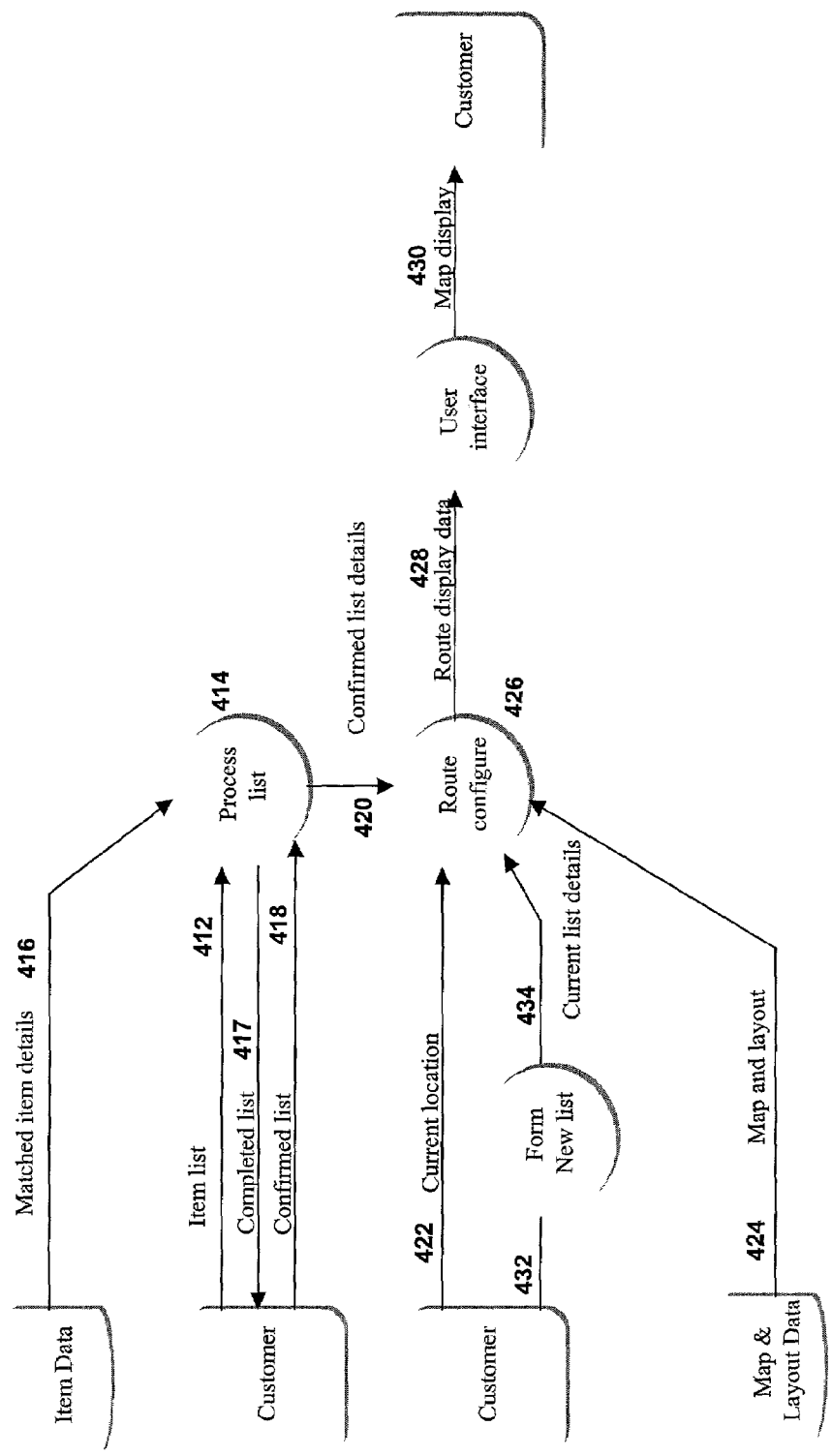
Figure 15: Flow Diagram for Route Creation and Display.

WIRELESS PERSONALIZED SELF-SERVICE NETWORK

BACKGROUND OF THE INVENTION

1. Field of the Invention

The present invention is directed to a wireless personalized self service system that matches multiple users with multiple interests and, more particularly, the present invention provides components to match user interests, requests, and transactions against a database/archive to optimize user efficiency.

2. Description of the Related Art

Consumers presently spend a considerable amount of time shopping for essentials and luxury items. Typically, a consumer will prepare either a physical or mental shopping list of desired items prior to traveling to the store. The list will may contain the type of item needed and perhaps the preferred brand. However, the consumer often lacks the specific brand information needed to make a complete and accurate list describing the products to be purchased. Due to the incompleteness of the list, upon arrival at the appropriate store the consumer is presented with a variety of options related to the type and amount of each item on the list. The consumer must decide upon the brand of item, type of item (i.e. fresh, frozen, seasoned, plain, etc.), and the amount of the item needed. This process must be repeated for each item on the consumer's shopping list, and is not limited to the grocery store context.

Various websites allow consumers to create grocery lists by selecting categories of needed groceries. The selections are in turn sorted into a list that may be printed and will contain the needed items grouped into categories such as produce, meats, and toiletries. The printed list may state, for example, "Meats: Chicken, Ground Beef, Pork". Although the list creating websites remove the need to handwrite the list, once the consumer arrives at the store, he or she is still faced with a wealth of decisions regarding the brand, type, and amount of the item.

Consumers face similar difficulties when creating lists of exhibits at a museum, rides at an amusement park, or any other similar situation. Each place of interest contains multiple options of which the consumer may be unaware:

Once a list has been finalized to the extent possible, and prior to the consumer's departure for the store, a particular store or stores must be located. The consumer may consult a telephone book or may simply visit a local store with which he or she is already familiar. Consumers that are unfamiliar with their local geographic area may have difficulty locating a store that offers the needed products. This problem will become more apparent to consumers that are traveling or otherwise away from home and in need of a store in close proximity to their current location.

Once the consumer has located a store or stores believed to possess the needed items, the consumer must identify where within the store the needed items are located. When a consumer desires to purchase yogurt, for example, the consumer must first locate the aisle containing yogurt. This often forces the consumer to wander through the store searching for the correct aisle. This can prove to be a daunting task, and may be further exacerbated by the ever-expanding size of many stores.

Grocery stores and large "super stores" have sought to decrease the amount of time consumers spend looking for items by grouping similar products together, labeling the aisles, and placing store directories on shopping carts. However, consumers may still have difficulty in determining the most efficient route of travel between aisles of a single store, or when traveling between multiple stores searching for additional items from their shopping list.

Despite modern advances in grocery store configuration, consumers still lack the ability to create a complete and accurate shopping list prior to arriving at the store. The consumer may also continue to have difficulty locating an appropriate store, and then locating items within the store and traveling between aisles and departments when looking for items from the shopping list. The above described manner of shopping consumes a significant amount of the consumer's valuable free time that could otherwise be better utilized.

SUMMARY OF THE INVENTION

It is an aspect of the present invention to provide a networked self-service system that may be used in supermarkets, music stores, libraries, bookstores, hardware stores, warehouses, museums, shopping malls, theme/amusement parks, conference facilities, airports, and at many other establishments that provide goods and services.

It is an additional aspect of the present invention to provide a system to improve customers' shopping experiences by assisting customers to plan, locate, and make payment in an efficient manner that reduces the time and effort spent searching for items, and in traversing the supermarket, museum, or other facilities, for the purpose of viewing items of interest The above aspects can be attained by a system that allows users to configure and reconfigure a list based on customer needs, time, and present location. The system will match multiple users with multiple interests and facilitate user list creation by matching incomplete user lists with a database/archive of goods and services. The system will identify needed stores and places of interest and will provide directions to the desired location. The system will display the shortest path of traversal to retrieve a given set of items or to visit desired places of interest. The system will provide end to end data flow from multiple customers to multiple servers by means of SMS/push.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 depicts a broad overview of the Wireless Personalized Self-Service Network.

FIG. 2 shows an example service list from which the customer may select a service.

FIG. 3 depicts a high level end to end system architecture of the Wireless Personalized Self-Service Network.

FIG. 4 shows a typical system architecture for a wireless networked store that participates in the Wireless Personalized Self-Service Network.

FIG. 5 shows the signal flow of a customer request for a store location and directions to that store.

FIG. 6 depicts the end to end data flow of the Wireless Personalized Self-Service Network.

FIG. 7 is a flow chart for the list matching service of the Wireless Personalized Self-Service Network.

FIG. 8 provides an example of a client server implementation for web enabled customer terminals.

FIG. 9 depicts the component breakdown of the Wireless Personalized Self-Service Network.

FIG. 10 provides a routing example.

FIG. 11 depicts a routing table used to generate the routing example contained in FIG. 10.

FIG. 11a depicts a shop item table.

FIG. 11b shows an example item list table.

FIG. 11c provides an example of a typical partially consumed item list table.

FIG. 12 depicts a typical shop shelf layout.

FIG. 13 depicts a shop shelf layout table used to generate the shop shelf layout.

FIG. 14 shows an example route display shown to the customer.

FIG. 15 depicts a flow diagram for the creation and display of a typical route.

DETAILED DESCRIPTION OF THE PREFERRED EMBODIMENTS

The present invention is directed to a system for improving the consumer shopping experience by assisting the consumer in planning the shopping trip, locating the needed items, and making payment in an efficient manner, thereby saving the consumer valuable time and effort. It should be emphasized that the reason for creating such a system is integral with the broadest problems associated with shopping for goods and services and is not limited to shopping for any particular type of good or service.

In a typical shopping experience using the present invention, a customer creates a list of items on a PCS type device that the customer wishes to obtain. This is accomplished by accessing a website of a store or other purveyor of the articles and selecting items carried by the purveyor, or the user can create a keyword list, such as tomatoes, milk, etc., which is used to search websites for purveyors of the objects. Once the list is created, the PCS device is provided geographical instructions or a route for traveling to the various purveyors. When at a purveyor, the PCS device is loaded with a best route through the store to obtain the items on the PCS or the PCS can transfer the list to a smart store device such as a smart shopping cart which displays the best route. As the smart shopping cart is loaded with the needed objects they are removed from the list. If the customer deviates from the route such as by interrupting their shopping with a visit to a coffee shop, the smart cart or PCS is provided with the best route through the store to complete the shopping from the current location of the customer. A more detailed description of how this is accomplished is provided below.

The present invention can be implemented in a system, such as illustrated in FIG. 1. FIG. 1 depicts a broad overview of the Wireless Personalized Self-Service Network ("WPSSN"). The WPSSN is designed to support multiple users with multiple interests. The back-end network 10 may be owned by an application service provider ("ASP"). The ASP will support multiple applications for users with varying interests by facilitating communication between consumers and various desirable services and destinations (i.e. Museum, Shopping, Mall, Library). The ASP will send such communication through the Internet 12 to a service gateway 14. The service gateway 14 receives requests from consumers and pushes relevant data to the consumers through an ATM or IP core network 16. ATM or Asynchronous Transfer Mode is a network technology that may be used for both local and wide area networks and supports real-time voice, video, and data transmission. ATM uses switches that create a logical circuit from end to end, thereby guaranteeing quality of service. IP refers to the Transmission Control Protocol/Internet Protocol (TCP/IP). TCP/IP transmissions may be sent around the world via the Internet.

The core network 16 supports suitable conventional wireless location determination techniques including a location server. For the sake of simplicity, FIG. 1 does not show such a wireless determination infrastructure or server. The core network 16 may send and receive data through a cellular network 18 or through a radio network. The core network 16 may push data directly to a consumer PC 20, or may push data through a cellular network 16 or radio network to various types of consumer mobile devices. The core network 16 may also receive data requests directly from a consumer PC 20, or through a cellular network 16 or radio network. Mobile devices that may be used by consumers to send and receive data include, but are not limited to, pagers, mobile phones, pocket PCs, and personal digital assistants. The WPSSN may be accessed by consumers for the purpose of increasing efficiency at a variety of locations, including the library 22, a mall 24, shopping 26, and a museum 28.

The WPSSN may be used to obtain information pertaining to a wide variety of consumer goods and services. FIG. 2 depicts an example service list from which a consumer may choose a needed service. When a consumer logs-in to the ASP service, a menu 38 appears on the screen of the user's mobile device. The user selects a service corresponding to the destination they wish to visit or product they wish to obtain. The service gateway 14 receives service requests from users, analyzes the requests to determine the type of service requested, and routes the requests through the internet 12 to the server that supports the service. The system is quite general and capable of supporting a broad range of applications. Example applications are listed on the menu 38 as menu items. Depending upon the needs of the consumer, he or she may select Library 40, A1 Department Store 42, Museum 44, Amusement Parks 46, or any other application 48 that may be supported by the ASP.

FIG. 3 depicts a high level end to end system architecture for the WPSSN. The end-to-end system architecture of the WPSSN includes wireless access technologies, including a cellular network and Wireless LAN or "WLAN". The cellular network pictured in FIG. 3 includes 58 through 72, including a mobile station 58, a base station 60, a base station controller 62, a mobile switching center 64, a short message service center or an enhanced messaging center 66, an authentication authorization accounting 68, and location server 70. The cellular network may also include location related tools such as home and visitor location devices and associated database 72. The WLAN 74 contains a multi-media server, radius server, location server, and application servers and database. The high level end to end system architecture also includes an optional remote server and mass storage 74 for use by a shopping store or similar entity for inventory and tracking purposes.

A typical system architecture for a wireless networked store that is participating in the WPSSN is depicted in FIG. 4. A typical wireless networked store may contain personal mobile devices or "customer terminals" 86. Where a shopping cart is needed to carry the consumer goods, a wireless-enabled shopping cart 88 will be used in the wireless networked store. The wireless-enabled shopping cart 88 may be Bluetooth-enabled or have access to a WLAN that adheres to the 802.11 IEEE standards. Bluetooth is a wireless network technology that allows for short-range transmission of data between for point-to-point and multipoint applications. Similarly, an 802.11 WLAN is a local area network that transmits over the air and provides 1 or 2 Mbps transmission in the 2.4 GHz band. If the customer has elected to use a wireless-enabled shopping cart 88, the customer would transfer his or her shopping list from their customer terminal 86 to the wireless-enabled shopping cart 88. The wireless-enabled shopping cart 88 then communicates with pico-cell base stations 90.

A base station is a transmitting and receiving station for wireless transmission services. A pico-cell is a low power base station with a small coverage area used for indoor applications. The pico-cell base stations 90 are mounted throughout the store aisles 92. The store aisles 92 are subdivided into smaller grids or cells. Each cell is mapped onto a tuple (X, Y) denoting distances along the x and y axes relative to a reference origin. The location server database 94 is then loaded with a full knowledge of the floor plan. The local server 96 retrieves item information from the local database 94 that maps an (X,Y) location to a meaningful indication such as a shelf number in the store. Low power pico-cell base stations 90 are placed in a manner that will cover the entire area requiring WPSSN coverage.

As a customer with a wireless enabled cart 88 walks through the store aisles 92, the wireless enabled cart 88 communicates with several nearby base stations 90. The base stations 90 measure the strength of the signal transmitted by the cart 88. Signal strength and distance have a mathematical relationship; the closer the cart is to the base station 90 the stronger the signal. The signal is a vector with both magnitude and direction or phase information. If only the magnitude of the signal strength is measured, then the cart 88 is within a circle of a certain radius centered at the base station 90. Using measurements from several base stations 90, a conventional algorithm can determine the common area of intersection of several circles to determine the location of the cart 88. When differences in signal strength received by two neighboring base stations 90 are used to estimate the location, the focus of the cart 88 is a hyperbola. By using measurements from several base stations 90, the intersection of several hyperbolae will yield a location estimate. Other techniques use angle of arrival, the foci being a straight line. Position determination techniques such as these are widely used in wireless technology today. A company known as Webraska Mobile Technologies (www.webraska.com) of Maisons-Laffitte, France, has demonstrated similar location-based services for use inside exhibition halls.

The wireless networked store system architecture shown in FIG. 4 also contains various servers connected through the WLAN for use by the store to further enhance the shopping experience. These servers may be added to the WPSSN at the option of the shopping store. A multi-media server 98 typically is used by the store to push advertisements and coupons to the customer terminals 86 or the wireless-enabled shopping carts 88. The multi-media server 98 typically pushes pictures of the needed goods to further aid in the location of the goods. A radius server 100 is be used by the store to authenticate and process purchases made by the customer through a scanner connected to the wireless-enabled cart 88. A remote server 102 is used by a franchise or chain store to send data to the company headquarters. The mass storage 104 is be used by the company headquarters to keep track of the data relayed by numerous remote servers 102.

When a WPSSN user finalizes their list of needed items or services, he or she will make a request for a store location and directions to that location. FIG. 5 depicts the typical signal flow for a customer request for store location and directions to the store. Prior to the request for directions, and not shown in FIG. 5, the mobile station initiates a call using an access channel through a radio link interface to the base station and base station controller. The mobile switching center receives the call and makes an inquiry for user validation. Depending upon whether the mobile station user is located within their home network or visiting another network, the mobile switching center will obtain user verification by making a request to either the Home Location Registration server or a Visitor Location Registration server. Once the registration and validation procedure is complete, the user or customer is ready to use the WPSSN location services.

The customer begins by interacting with the mobile station and requesting 114 directions to a store. The store location request is sent 116 to the base station/base station controller. The base station/base station controller in turn forwards 118 the request to the mobile switching center. The mobile switching center sends 120 the request for store location and directions to the location server. The location server makes 122 a request to the location database for routing information from the location of the mobile station. The location server will run the location determination application software routine (i.e., best route algorithm) and the location database will provide 124 the map information (x, y coordinates) with the relevant conventionally produced routing information. Upon receiving the routing information, the location server sends 126 the store location and most efficient route information to the mobile switching center. The mobile switching center propagates 128 the information to the base station/base station controller. The base station/base station controller forwards 130 the information to the mobile station and the mobile station in turn displays 132 the store location, a graphical map, and directions to the store.

FIG. 6 depicts an end to end data flow for the WPSSN. Before the customer begins shopping, visiting a museum or theme park, or any other activity offered by the WPSSN service, the customer prepares 142 a list and enters the list into a personal wireless terminal such as a mobile station, SIM or UIM smart card, or PDA. The list may be a shopping list, movie list, or any other type of list, and may be created using a generic product names. The customer's mobile device sends 144 a short message service message to a wireless access point. In this example the customer is likely indoors, therefore the wireless access point would be a low power base station, such as a pico-cell. A short message service message ("SMS") is a short message that is sent through the mobile device's control channel, separate and apart from the voice channel. The wireless access point relays 146 the SMS message to the local server. The local server will map 148 the customer input list and send 150 back a completed list (see FIG. 7) as a SMS message to the access point, which in turn forwards 152 the completed list to the user. The completed list will contain, if appropriate, the item number/exhibit name, price, location (e.g., aisle number, exhibit number, floor number), current inventory level, traffic level, or any other relevant information. The list is tailored to each specific service that is available through the WPSSN, and only items relevant to that specific service will be sent to the user. If several matches are found for a particular item, the customer will delete the unwanted goods and retain the one desired item. If a certain item is not available, the WPSSN may recommend a substitute.

Upon completion 154 of the shopping list, the total cost of the items will be displayed. The customer has the option of changing and finalizing the list before finally beginning to shop. If the service desired involves visiting exhibits in a museum, a similar chain of events takes place. The cost may include the entrance fee to the museum plus any additional fees for special exhibits. The service may request that the visitor initially provide a list of interests to which the service will match its database and provide additional recommendations to the visitor. The customer has the option of reviewing the recommendations and modifying the initial list. An updated fare would be provided to the customer at this point. Similar tasks may be performed for other scenarios.

If the user wants directions from their current location to the store the best route is provided as previously discussed. If the user does not need such directions, the users makes their way to the store site.

When the customer arrives at the intended site his or her mobile device will communicate with the local server via the nearest access point/base station. In a supermarket this communication takes place via a wireless-enabled shopping cart that the customer will pickup upon entering the store. In a museum, theme park, amusement park, etc., the visitor may be provided with a Bluetooth-enabled badge or a visitor's Bluetooth-enabled handheld device. Whatever mobile device is used, it communicates with the local service. Subsequent communication with the local server takes place via either the special purpose badge or handheld device. In FIG. 6, a supermarket with wireless-enabled grocery carts is used as the example.

Upon receipt of the shopping cart, the customer's shopping list is transferred to the cart and the cart synchronizes 162 with the customer's mobile device. The cart sends 164 the list and a location request to an access point which forwards 166 the list to the local server. The local server generates 168 a complete and up-to-date customer list and sends 170 the complete list and location information to the wireless access point. The local server for the site conventionally determines the best route through the store to obtain each item on the list. The wireless access point forwards 172 the information to the shopping cart which displays directions to each of the items on the list. The customer then follows the directions provided and locates 174 each item on the list and scans the item with a scanner attached to the shopping cart. The shopping cart's built in scanner allows the customer to scan the items to facilitate the purchase. Once the customer scans all of the list items, the local server transmits 176 a payment method menu to the wireless access point which forwards 178 the menu to the shopping cart. The customer then selects the desired payment option and makes 180 payment via the shopping cart. The shopping cart sends 182 the payment to the access point, where it is forwarded 184 to the local server. The local server conducts 186 authentication, authorization, and verification of the payment and sends 188 a receipt to the access point. The access point sends 190 the payment confirmation and receipt to the shopping cart where the receipt is sent 192 to the customer's mobile device. When the customer receives the receipt the local server may create 194 a transaction log and upload 196 the transaction information to a remote server.

WPSSN users typically begin their interaction with the network by creating a partial shopping list and the WPSSN facilitates the completion and finalization of the list. The FIG. 7 flowchart shows an example of the WPSSN list generation for a single store. The process is repeated for each store the user visits. The WPSSN creates an item list by matching the initial item list sent by a user and adding corresponding location, price, and quantity information to the list. List matching can be implemented by first parsing 206 the SMS message sent by the user and containing the original item list. Every element in the list array is set 208 to be empty through the Initialize Partial list array 1:n. The parsing extracts 210 the key words by removing all words such as "the" and "a". The WPSSN then applies 212 a partial matching algorithm to inventory item names contained in the inventory database 214. For example, if the item keyword is "carrot" then all items in the inventory database 214 containing "carrot" will be regarded as matching items. Examples would be "baby carrots", "1 pound carrot bag", and "2 pound carrot bag". If the item keywords are "sweet" and "potatoes" then all the items in the inventory database 214 matching these two words will be selected. The WPSSN then stores 216 the list of various carrot products and other items into a partial list. The partial list is sent 218 to the customer's mobile device via SMS. The customer updates 220 the partial list by selecting the exact item needed for each of the initial list items. Once complete, the customer selects 222 an appropriate button on the mobile device.

A WPSSN user may wish to access the network via the internet and specifically the world wide web. The user may gain access through their personal computer, a mobile device, or through any of large number web enabled products. FIG. 8 provides an example of a client server WPSSN implementation for web enabled customer terminals which can be used to produce the list discussed above. The web enabled customer terminal/mobile device 232 communicates with the application server 234 through Wireless Markup Language (WML), Handheld Device Markup Language (HDML), or Mobile Information Device Profile (MIDP). The application server 234 may include, among other servers, a web server 236. The web server 236 contains a presentation layer 238 and a server business logic layer 240. The presentation layer 238 includes a java server page titled list.jsp 242. List.jsp 242 provides a user interface allowing the customer to create, add, delete and modify any type of list; or to organize the list in item location or classification order. Applications reside in the application server 234 and access the database using entity beans via ODBC/JDBC. An application retrieves database information to perform the reconfiguration task. The list.jsp 242 calls the list session bean 244 which in turn calls the list entity bean 246 to create a list in the database and retrieve the list to allow the user to view and perform the configure operation. The configuration can be triggered either by the customer or by the shopping cart's communication with the base station. The list entity bean 246 accesses the item information to match the customer's list items.

The listConfig session bean 248 allows the customer to insert, delete, configure, or reconfigure the list by calling the listConfig entity bean 250 to access location and item information from the database 252. The application server 234 communicates with the database 252 through use of a Java DataBase Connectivity (JDBC) or Open DataBase Connectivity (ODBC) interface. Within the database 252 is inventory.item 254 which stores information on item id's, names, locations, barcode information, price and quantity. Inventory.location 256 stores shelf numbers or base station id's, locations, and device id's. Customer.list 258 stores the item names and matching item numbers, status, and date information.

FIG. 9 depicts a component breakdown of the WPSSN system. In a particular application of the WPSSN system, only a subset of the system components/features may be required or certain components may need to be adapted to suit the service. For example, in a library scenario coupon services will not be needed, however, book advertisements may be desired.

The WPSSN includes the wireless-enabled client devices or "personal terminals" 368 which contain a user interface and optionally a multimedia player. The personal terminals 368 may be Bluetooth-enabled mobile devices or 802.11 WLAN-enabled PDA's. The user interface ("UI") will allow users to enter, update, and send a list, as a SMS message. Once the partially matched list is received back from the list matching service, the UI will also allow the list to be parsed and displayed to the user. The user can update the items to complete the list. The UI may be implemented by responding to the user's pressing a number or function key on a phone or PDA. One of the UI implementations may be a Java 2 Micro Edition (J2ME) application running on a Java phone. The java phone will have a Kilobyte Virtual Machine (KVM) to run the J2ME application, and will communicate with the cart device via Remote Method Invocation (RMI) over TCP/IP, HTTP, or socket protocol (the "Wireless Network" 370). The multimedia player is an optional component of the personal terminal. The multimedia player could be a real player, MS media player, RIO MP3 player, or other similar device. The multimedia player could be utilized for multimedia advertisements or store demonstrations.

At the store's option, wireless-enabled shopping carts 372 may also be used in the WPSSN system. The cart devices include a mini processor, a radio communication component-such as a Bluetooth chip, and a mini display. The cart device 372 will also include a UI to allow customers to interact with the system over the wireless network 370. Through the UI the customer may enter a pin code to start scanning the purchased items, perform e-money transfers, and complete other shopping activities. The UI can be implemented as a J2ME application and will communicate with the personal terminals through the wireless network 370. The cart device 372 will also include a Barcode scanner that will scan product barcodes and decode for barcode processing. The scanner will be an existing product such as NCR model #QuickScan 6000 barcode scanner. The cart device 370 will also include a Barcode process to accept and store scanned barcodes. Once the customer completes his or her shopping, the list and associated payment information will be sent through the wireless network 370 to the nearby shelf base station 374 and then to the local server 376. The local server 376 will process the payment and send the results to the handset's display via the base station 374. Depending on the particular WPSSN implementation, the results may also be sent to a cart device, or in a bookstore the results may be sent to a handset.

The shelf base station 374 performs location notification and transaction processing. For the location notification function it communicates with the local server 376 and recognizes the presence of a cart device 370 and notifies the customer when an item from the customer list is located on the shelf to which the shelf base station 374 is attached. The shelf base station 374 performs the transaction process upon receiving the completion request from UI on the cart device 372. The shelf base station 374 sends the transaction request to the local server 376. The local server 376 will send a payment method selection menu to allow the customer to interact with the system so as to complete the payment transaction.

The local server 376 contains a register service which allows the networked store to register the services offered and allows customers to subscribe to the offered services. The local server 376 also includes SMS service used to send and receive customers lists. A security service is also maintained on the local server 376 to perform authentication and authorization for financial transactions. A payment transaction service also resides on the local server 376 and handles payment transactions, updates the inventory levels, and logs transactions to the database. A list matching service as described in FIG. 7 will also reside on the local server 376. The local server 376 may contain any number of additional services as depicted in FIG. 9 and includes in the local database the information 378 shown. Likewise the remote server 380 has a remote database with contents 382. At the option of a particular store, additional features may be added to the WPSSN, such as the remote server, database, and associated applications pictured in FIG. 9.

When a WPSSN user arrives at a selected store, he or she will be presented with many aisles and shelves containing a large number of goods, including the list items. FIG. 10 provides an example of the shelf layout of a WPSSN enabled store for displaying items such as books, canned goods, etc. The location of the selected items may be mapped to the item list table, shown in FIG. 11, and the item list location may also be mapped to the item location table to determine the exact location designated by (x1, y1) and (x2, y2) points. Additionally, the current location of the customer/shopping cart may be determined by the location server in terms of (x, y) coordinates. The shortest distance from the customer's current position to an item's location may be calculated using the method described for FIG. 12. As the customer moves from aisle to aisle and from shelf to shelf to pick up each list item, the located item's location becomes a new reference point for determining the next best route.

Stores that contain the various list items may be located using the Global Positioning System (GPS). In such a situation the GPS would work in conjunction with a location server and base stations. A GPS receiver antenna is part of the wireless access infrastructure and commercially available. Location techniques other than using GPS may also be employed. The location determination technique can locate the exact location of the stores required by the customer's list. A Location server may be built using ETSI Generic Mobile Location Center (GMLC) standard, which applications interact with using the interfaces specified by GMLC.

Once a store has been located, the customer will receive in-store routing information to aid in locating items within the store. FIG. 11a depicts a conventional database containing item location information for determining where items are located within a WPSSN participating store. The shop item table includes shelf identification and location information, and item identification and location information. The item table resides on the participating store's server and interacts with the store network to facilitate the creation of a geographical route as depicted in FIG. 12. FIG. 11b depicts a typical shopping list item table including, in addition to the fields contained in FIG. 11a, a field indicated whether the user has yet to pick up each needed item. FIG. 11c depicts a partially consumed item table including an indication that the user has located and picked up the required lean beef. The partially consumed item table facilitates reconfiguration of the list and geographical route upon the user's obtaining of list items.

The information contained in the shelf shop layout table and shelf shop item table may be used to create a conventional geographical route through the store. FIG. 12 depicts a typical routing example for a WPSSN participating store. This diagram shows the paths in aisles within the store between intersections or nodes of the store. Such a layout allows a conventional shortest path routing algorithm to determine a shortest path through the store to all of the items on the list. The route is created through use of a routing table such as depicted in FIG. 13. The route is created in a manner similar to the method used by the RoutePoint Software by Visual Software, Inc., of Washington Crossing, Pa., and described at http://www.routepointe.com/CreatingARoute.htm.

Once the customer's route has been created, a route map will be displayed on the customer's mobile device or shopping cart. Two example route map displays are pictured in FIG. 14. The route display 400 is for directions to the shopping items from the entrance of the store and the route display 402 is for directions to the items from another entrance to the store. The route display will be continuously updated to provide direction to the next list item.

FIG. 15 depicts a flow diagram of the WPSSN list creation, route creation, and display. The customer's item list is initially sent 412 to the WPSSN for processing 414. The customer list is compared to the WPSSN item data and matched item details are sent 416 to the list processor. Depending upon the particular implementation of the WPSSN, the list processing may be performed either locally or remotely. Once processed, a completed list is sent 417 to the customer for review. The customer confirms the list and finalized list is sent back 418 to the local server [list processor]. The confirmed list details are then sent 420 to the server for route configuration. The customer's mobile device or personal terminal sends 422 current location information to the server and map and layout data is also sent 424 from the local server to the remote server. The server uses (geographical and in-store as necessary) the data received to configure the best route and sends 428 the route display data to the user interface of the mobile device/personal terminal or shopping cart. The user interface then generates 430 a map display for the customer. When the customer finds and scans an item from the list, the personal terminal creates 432 an updated list and sends 434 the current list details to the server. The personal terminal will also send 422 current location information when the user wanders away from the designated route and when list items are picked up. The server uses the current list details and current location information to reconfigure the route as needed. The process is repeated as needed for each additional list item.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The present invention has been described with respect to a grocery store implementation. Implementations for a museum, library, and mall, among others, are contemplated and would vary accordingly.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of a wireless personalized self-service to match multiple users with multiple interests, comprising:
   allowing a user to create a list of items to be obtained;
   determining a geographical route to a site having the items based on the list of items without requiring the user's knowledge of the site and determining an in-site route to the items, the in-site route being the shortest route; and
   reconfiguring the in-site route when a deviation from the in-site route occurs, and
   where the allowing comprises
   allowing the user to submit an original list of items,
   matching the original list including interests matched to the user by a server to items at plural sites,
   returning a revised partial list to the user responsive to the list matching and allowing the user to complete the list by removing and selecting items, where the list, the geographical route and the in-site route are transmitted between the server and the user via short messaging service.

2. A method as recited in claim 1, wherein the list, the geographical route and the in-site route are transmitted between a server and the user via push technology.

* * * * *